US010644640B2

(12) United States Patent
Kleinknecht

(10) Patent No.: US 10,644,640 B2
(45) Date of Patent: May 5, 2020

(54) METHOD AND CONTROL DEVICE FOR HEATING A DEVICE WITH A BRUSHLESS DIRECT CURRENT MOTOR

(71) Applicant: Robert Bosch GmbH, Stuttgart (DE)

(72) Inventor: Horst Kleinknecht, Fichtenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/326,743

(22) PCT Filed: Jun. 23, 2017

(86) PCT No.: PCT/EP2017/065514
§ 371 (c)(1),
(2) Date: Feb. 20, 2019

(87) PCT Pub. No.: WO2018/036687
PCT Pub. Date: Mar. 1, 2018

(65) Prior Publication Data
US 2019/0181791 A1    Jun. 13, 2019

(30) Foreign Application Priority Data

Aug. 25, 2016   (DE) .................. 10 2016 216 041

(51) Int. Cl.
*H02P 29/62* (2016.01)
*H02P 6/00* (2016.01)
(Continued)

(52) U.S. Cl.
CPC ............... *H02P 29/62* (2016.02); *H02P 6/00* (2013.01); *F01N 3/208* (2013.01); *F01N 3/2896* (2013.01)

(58) Field of Classification Search
None
See application file for complete search history.

(56) References Cited

U.S. PATENT DOCUMENTS 3,582,712 A * 6/1971 Blair .................... G01R 31/343
361/25
3,963,962 A * 6/1976 Sutton .................... H02H 7/085
361/24

(Continued)

FOREIGN PATENT DOCUMENTS

| DE | 679940 | 8/1939 |
| DE | 596636 | 9/1940 |

(Continued)

OTHER PUBLICATIONS

International Search Report for Application No. PCT/EP2017/065514 dated Nov. 20, 2017 (English Translation, 3 pages).

*Primary Examiner* — Bentsu Ro
(74) *Attorney, Agent, or Firm* — Michael Best & Friedrich LLP

(57) ABSTRACT

The invention relates to a method for heating a device driven with a brushless direct current motor, in which method a voltage is applied to stator coils of the brushless direct current motor during a heating phase. The invention further relates to a device for carrying out said method. According to the invention, the stator coils are series-connected during the heating phase. The series connection of the stator coils increases the resistance by a factor of 4.5 compared to a parallel connection of a stator coil with a series connection of two stator coils, as occurs in a brushless direct current motor wired according to the prior art. The heating power is therefore also higher by a factor of 4.5 with the same operating current.

8 Claims, 2 Drawing Sheets

(51) Int. Cl.
*F01N 3/20* (2006.01)
*F01N 3/28* (2006.01)

(56) References Cited

U.S. PATENT DOCUMENTS

| | | | | |
|---|---|---|---|---|
| 4,195,324 | A | * 3/1980 | Waltz | H02K 15/125 318/436 |
| 2012/0293102 | A1 | * 11/2012 | Kock | B25J 9/126 318/473 |
| 2015/0061437 | A1 | 3/2015 | Hudec | |
| 2017/0222595 | A1 | * 8/2017 | Daugherty, III | H02P 29/64 |

FOREIGN PATENT DOCUMENTS

| | | |
|---|---|---|
| DE | 2810201 | 9/1979 |
| DE | 2941330 | 4/1981 |
| DE | 10045291 | 3/2002 |
| DE | 102008001090 | 11/2008 |
| DE | 102012206822 | 10/2013 |
| DE | 102013216785 | 2/2015 |
| DE | 102013109522 | 3/2015 |
| DE | 102014222163 | 1/2016 |

\* cited by examiner

METHOD AND CONTROL DEVICE FOR HEATING A DEVICE WITH A BRUSHLESS DIRECT CURRENT MOTOR

BACKGROUND OF THE INVENTION

The invention relates to a method for heating an apparatus driven by a brushless DC motor, wherein stator coils of the brushless DC motor have an electric voltage applied to them during a heating phase.

The invention further relates to a control device for carrying out the method.

In motor vehicles propelled by a diesel internal-combustion engine a catalytic converter arranged in the exhaust passage can be employed for selective catalytic reduction (SCR) for the purpose of lessening the emission of nitrogen oxides in the exhaust gas. In this connection, a 32.5 percent solution of urea and water (Ad-Blue) from a storage reservoir is added in metered amounts to the exhaust gas upstream of the catalytic converter via a pump system and a nozzle with a pressure from 4.5 bar to 8.5 bar. The solution of urea and water freezes below −11° C. Therefore the storage-and-metering system has to be heated at low temperatures.

The solution of urea and water which is located in the storage reservoir is heated with a heating unit in the interior space of the storage reservoir. This heater heats up the solution of urea and water around the heater, an ultrasonic sensor for determining the filling level, the filter system and the intake-point. But the heating power is not sufficient to thaw out the complete hydraulic system of the metering system. The hydraulic pump system—also called the conveyor module—has to be heated additionally. For reasons of cost, a specific heating unit in the region of the hydraulic duct system is not provided. In order to thaw out the conveyor module, the pump is energized, in order, via the waste heat of the coil and the thermal linkage thereof to the mechanism and to the hydraulic ducts, to thaw out the latter and to keep them thawed out. The heating of the coil of the pump penetrates as far as the solution of urea and water via an armature and via a pump diaphragm. In some cases, thermal conductors are also provided in the conveyor module in such a way that the heat is directly conducted to the ducts.

A program flow provided in a control unit for the conveyor module determines, at the same time, the temperature of the solution of urea and water via a temperature sensor incorporated within the ultrasonic sensor for determining the filling level, the starting temperature of the coil (the temperature at the first moment without starting the heating function), and also takes the external temperature of the vehicle into consideration in the calculations. The coil temperature is monitored and also regulated over the entire heating process. Consequently it is ensured that the coil has the optimal heating temperature—that is to say, it does not introduce too little heat into the hydraulic system—but also that the coil does not become too hot, because otherwise a burn-out of the coil wire or damage to the pump mechanism may occur.

Coils in pump systems with reciprocating pumps have an internal resistance of, typically, 4 ohms. In the case of a regulated current in the "heating" operating mode of 2 amps, a power of 16 watts consequently results. If the mechanical drive of the pump is to be undertaken with a brushless DC motor (BLDC motor), this has a disadvantageous effect on the operation of the heating system. A brushless DC motor exhibits on its stator three stator coils arranged in a delta circuit or in a star circuit, and each stator coil may, in turn, have been split up into two or more partial stator coils. In operation, the three stator coils have voltage pulses, each offset by 120°, applied to them, and in this way generate a rotating field which drives a rotor equipped with permanent magnets. Each of the three stator coils, typically with 0.5 ohms, is of distinctly lower resistance than the coil of a reciprocating pump. The low resistance of the stator coils is necessary in order that a triggering of the brushless DC motor with a pulse-width-modulated triggering voltage is possible. In the following, the wiring of the brushless DC motor in a delta circuit will be considered. If the stator coils of the brushless DC motor are connected to a power supply via two of the three terminals for the purpose of heating, a parallel circuit arises consisting of a stator coil with a series connection of two stator coils. This arrangement has a resistance of 0.33 ohms and delivers a heating power of only 1.32 watts in the case of a flow of current of 2 amperes. An increase in the current through the stator coils, in order that a heating power comparable to a reciprocating pump is delivered, is not possible, since the stator coils are not designed for such a high current, and the strong magnetic field generated by them might then also demagnetize the permanent magnets of the rotor.

From DE 10 2013 216 785 A1 a washing machine is known with a control device for controlling a program flow, with a drum supported in a lye-container so as to be capable of rotating about a drum shaft, with an electric drive motor arranged outside the lye-container behind a lye-container wall, comprising a stator and a rotor, said drum shaft being driven directly by the rotor. In accordance with the invention there is provision that a heat-conducting connecting element, which consists of one or more heat-conducting components, is arranged between the interior space of the lye-container and the electric drive motor in such a way that the heat-conducting connecting element is in direct contact with the interior space and is able to transfer waste heat arising from an operation of the drive motor for the direct heating of an aqueous liquid located in the interior space of the lye-container.

Document DE 10 2013 109 522 B4 discloses a pump with a canned motor which exhibits a stator (1) with an internal rotor (17) arranged therein, wherein the stator (1) and the internal rotor (17) are separated from one another in liquid-tight manner by a split tube (21), arranged between the stator (1) and the internal rotor (17), which is made of a non-metallic material, wherein the stator (1) exhibits stator teeth (5) which extend radially in the direction of the internal rotor (17) and define with associated stator-tooth end faces (13) a receiving space for the internal rotor (17) and the split tube (21), wherein the split tube (21) bears against the stator-tooth end faces (13) and exhibits on its surface (23) facing toward the stator (1), in stator-tooth gaps (25) which are each defined by two mutually adjacent stator teeth (5), positively fitted ribs (27; 27*a*; 27*b*) which, starting from a rib foot (29) arranged on the split tube (21), taper in the radial direction with regard to a height (H), defined in the circumferential direction (U) of the split tube (21), of the ribs (27; 27*a*; 27*b*), wherein a stator tooth (5) consists of, respectively, a stator-tooth shank (7) and a stator-tooth head (11) which exhibits two stator-tooth-head parts (51*a*, 53*a*; 51*b*, 53*b*) which respectively rise above the stator-tooth shank (11) in both circumferential directions of the split tube (21), characterized in that rib flanks formed by side lines (39*a*, 40*a*; 39*b*, 40*b*) of the ribs (27; 27*a*; 27*b*) over the region of the height (H) of the ribs (27; 27*a*; 27*b*) are respectively in contact with a contour of the stator-tooth-head parts (51*a*, 53*a*; 51*b*, 53*b*)

which is shaped so as to be complementary to the side lines (39a, 40a; 39b, 40b) as points of support fixed so as to counter shearing, wherein the stator-tooth contour and hence the height (H) of the ribs (27; 27a; 27b) is designed in such a way that under operating-pressure loading in the entire region of the split tube (21) equivalent stresses in the split tube (21) are always less than the strength limit of the split-tube material.

Document DE 10 2012 206 822 A1 describes a control unit (1) for triggering a brushless DC motor (3), said control unit (1) being designed to supply the DC motor (3) with energy. In accordance with the invention there is provision that the control unit (1) has further been designed to heat up the DC motor (3), by the DC motor (3) being supplied with energy without an alternating electromagnetic field thereby arising in the DC motor (3).

Publications DE 10 2013 216 785 A1 and DE 10 2013 109 522 B4 deal with utilization of the waste heat arising in operation of a brushless DC motor for the purpose of heating up liquids. A separate heating operation without a rotary motion is not provided.

Document DE 10 2012 206 822 A1 describes a control unit and an operating method that make it possible to employ a brushless DC motor, on the one hand, as drive unit with a rotary motion and, secondly, for the purpose of heating without rotary motion. In contrast to the present invention disclosure, however, there is no provision to alter the circuit arrangement of the coil windings of the brushless DC motor for the purpose of improving the heating power.

SUMMARY OF THE INVENTION

It is an object of the invention to make a method available that makes it possible to use the stator coils of a brushless DC motor with an increased heating power in comparison with the state of the art.

It is a further object of the invention to make a control device available that is suitable for carrying out the method.

The object of the invention relating to the method is achieved by virtue of the fact that the stator coils are connected in series during the heating phase. By virtue of the series connection of the stator coils, the total resistance increases by a factor of 4.5 in comparison with a parallel connection of a stator coil with a series connection of two stator coils, such as occurs in the case of a brushless DC motor employed in accordance with the state of the art using delta wiring. For the same operating current, according to $P=R*I^2$ with power P, resistance R and current I, the heating power is consequently also higher by a factor of 4.5. If the brushless DC motor is employed for the purpose of driving a conveyor module for a solution of urea and water for an exhaust-gas cleanup in an arrangement for selective catalytic reduction (SCR) of nitrogen oxide in the exhaust gas of an internal-combustion engine, an increase of the operating current for the purpose of increasing the heating power would place an additional burden on the on-board power supply of a vehicle propelled by the internal-combustion engine and in this way would increase the fuel consumption. If the heating current is adapted to the requisite heating power by means of pulse-width modulation, an increase of the current would, in addition, adversely influence the electromagnetic compatibility of the system (EMC interference). Furthermore, by virtue of the structural design of the brushless DC motor, there are limits for the operating current thereof with regard to the temperature loading capacity but also the demagnetization of the rotor by the magnetic field caused by the heating current.

An adaptation of the heating power is made possible by the stator coils having a pulse-width-modulated operating voltage applied to them during the heating phase. An adaptation of the heating power to the requirements of the system and also a protection against excessive system temperatures is obtained by temperature information also being taken into consideration. For this purpose, in accordance with the invention there is provision that a set value of an electric current through the stator coils during the heating phase is determined from a temperature of the brushless DC motor and/or from a temperature of a triggering circuit for the brushless DC motor and/or from a resistance of the stator coils. The temperature of the brushless DC motor can be determined via a temperature sensor provided there. Alternatively, it is also possible to determine the temperature from the temperature coefficient of the wires of the stator coils via a resistance measurement. The switching elements of the control device are flowed through by the heating current, so the temperature thereof can also be drawn upon for a determination of the temperature of the brushless DC motor by approximation with the aid of a model.

A closed-loop control of the temperature of the system is made possible by the electric current through the stator coils being regulated to the set value during the heating phase.

The object of the invention relating to the control device is achieved by a seventh switch being provided for opening the delta circuit of the stator coils of the brushless DC motor for a series circuit during the heating phase. By virtue of the series circuit, the electrical resistance of the arrangement is increased by a factor of 4.5 in comparison with a delta circuit with energizing of two terminals. For the same operating current, a heating power that is 4.5 times higher is therefore released.

During a heating phase, in one configuration of the invention there is provision that the series circuit can be connected via one of the switches connected to a first power supply, and that an eighth switch is provided for connecting the series circuit to the second power supply during the heating phase. A pulse-width modulation of the heating power can be undertaken by means of one of the switches connected to the first power supply or with the eighth switch.

A preferred configuration of the invention provides that the seventh switch and/or the eighth switch take(s) the form of a MOSFET (metal-oxide semiconductor field-effect transistor).

The method or the control device have a particularly advantageous application for heating a conveyor device for a solution of urea and water in an exhaust-gas cleanup system which cleans exhaust gases of an internal-combustion engine by means of selective catalytic reduction. On the one hand, a brushless DC motor enables a particularly efficient and durable drive of the conveyor device. On the other hand, the control device according to the invention makes possible a heating power increased by a factor of 4.5 in comparison with the state of the art for the same operating current.

BRIEF DESCRIPTION OF THE DRAWINGS

The invention will be elucidated in more detail in the following on the basis of an embodiment example represented in the figures. Shown are.

DETAILED DESCRIPTION

Figure 1:
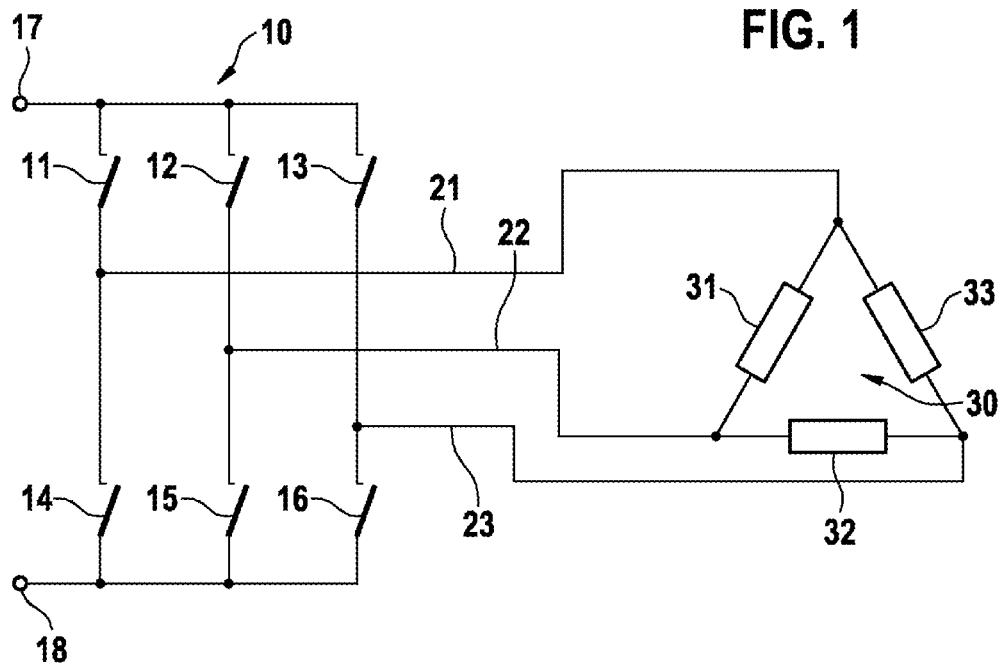
FIG. 1 a brushless DC motor with control device.

FIG. 1 shows a first control device 10 according to the state of the art for a brushless DC motor 30. The brushless DC motor 30 (BLDC motor) consists of a first stator coil 31, a second stator coil 32 and a third stator coil 33 as well as a rotor with permanent magnets. Said motor may have been constructed as an internal-rotor motor with rotor inside, or as an external-rotor motor with rotor outside and stator inside. The stator coils 31, 32 and 33 may each have been split up into two or more partial coils. The control device 10 represented here schematically includes a first switch 11, a second switch 12, a third switch 13, a fourth switch 14, a fifth switch 15 and a sixth switch 16. The first switch 11, the second switch 12 and the third switch 13 are connected to a first power supply 17. The fourth switch 14, the fifth switch 15 and the sixth switch 16 are connected to a second power supply 18. A connection of the first switch 11 to the fourth switch 14 is connected to the first stator coil 31 and to the third stator coil 33 via a first feed line 21. A connection of the second switch 12 to the fifth switch 15 is connected to the first stator coil 31 and to the second stator coil 32 via a second feed line 22. A connection of the third switch 13 to the sixth switch 16 is connected to the second stator coil 32 and to the third stator coil 33 via a third feed line 23.

Switches 11, 12, 13, 14, 15 and 16 are constructed as MOSFETs with freewheeling diode and can be triggered in the control device 10 with mutually phase-shifted signals in such a manner that a rotating field forms which sets the rotor, equipped with permanent magnets, of the brushless DC motor 30 in rotary motion. A shunt resistor may have been provided in the feed line to the second power supply 18, so that from a drop in voltage at the shunt resistor an electric current can be determined that the first control device 10 picks up.

If the brushless DC motor 30 is employed for the purpose of driving a conveyor device for a solution of urea and water for an exhaust-gas cleanup system for the purpose of selective catalytic reduction of nitrogen oxides in the exhaust gas of an internal-combustion engine, the waste heat arising in the course of its operation can also serve for heating the conveyor device. This is desirable particularly at low temperatures, since otherwise below $-11°$ C. the solution of urea and water freezes and the exhaust-gas cleanup is not operational. In such a case, in reciprocating pumps there is provision that the coils of the pump have a current applied to them and the heat arising is utilized for the purpose of heating the solution of urea and water in the conveyor module. By way of example, the coils have a resistance of 4 ohms and have a current of 2 amperes applied to them, so according to $P=R*I^2$ a thermal output of 16 watts can be utilized. If a brushless DC motor 30 is employed as drive unit, the stator coils 31, 32 and 33 thereof have, by way of example, a DC resistance of 0.5 ohms. The low resistance of the stator coils is required in order that a triggering of the brushless DC motor 30 with a pulse-width-modulated triggering voltage is possible. For the purpose of heating, the first switch 11 and the sixth switch 16 can be closed, and in this way the brushless DC motor 30 can be connected to the first power supply 17 and to the second power supply 18. This results in a parallel circuit consisting of the third stator coil 33 with a series connection of the first stator coil 31 and of the second stator coil 32. This arrangement has a resistance of 0.33 ohms and delivers a heating power of only 1.32 watts in the case of a flow of current of 2 amperes. An increase of the current through the stator coils 31, 32 and 33, in order that a heating power comparable to a reciprocating pump is delivered, is not possible, since the stator coils are not designed for such a high current, and the strong magnetic field generated by them might then demagnetize the permanent magnets of the rotor.

Figure 2:
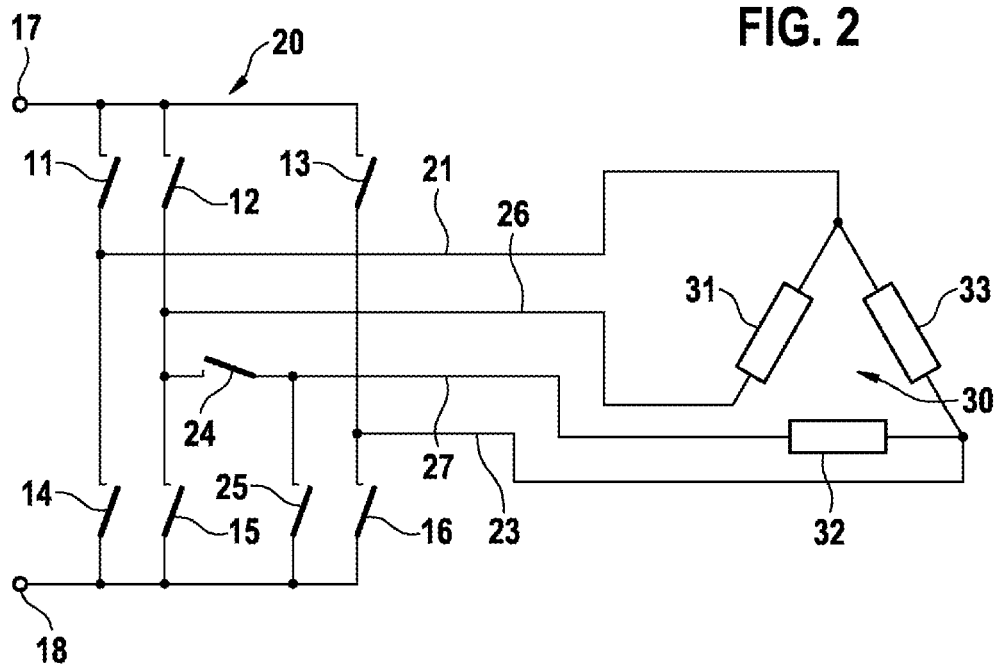
FIG. 2 a control device according to the invention for heating with a brushless DC motor, FIG. 3 a triggering circuit for the control device according to the invention, FIG. 4 a further control device according to the invention.

FIG. 2 shows a second control device 20 which represents a supplement and improvement, according to the invention, to/of the first control device 10. Components in FIG. 2 that are identical to components in FIG. 1 have been provided with the same identifiers. The connection of the second switch 12 to the fifth switch 15 is connected to the first stator coil 31 via a fourth feed line 26. A connection to the second stator coil 32, as in the first control device 10, does not exist in the second control device 20. The connection of the second switch 12 to the fifth switch 15 is connected to a seventh switch 24 which, in turn, is connected to the second stator coil 32 via a fifth feed line 27. The connection of the seventh switch 24 to the second stator coil 32 is connected to the second power supply 18 via an eighth switch 25. The seventh switch 24 and the eighth switch 25 are constructed as MOSFETs. The supplement according to the invention consists in the fact that it is made possible to connect the first stator coil 31, the second stator coil 32 and the third stator coil 33 in series, and to connect them to the first power supply 17 and to the second power supply 18. For this purpose, the second switch 12 and the eighth switch 25 are closed for heating operation. All the other switches remain open. The current path extends from the first power supply 17 to the second power supply 18 via the second switch 12, the first stator coil 31, the third stator coil 33, the second stator coil 32 and the eighth switch 25. By virtue of the series connection of the stator coils 31, 32, and 33, by way of example the total resistance of the heating arrangement is 1.5 ohms, so that with the current of 2 amperes a power of 6 watts is delivered, corresponding to 4.5 times the heating power when use is made of the first control device 10.

For the purpose of adapting the heating power there may be provision to clock the current with a pulse-width-modulation signal by means of the second switch 12 or by means of the eighth switch 25. The pulse-width modulation can be triggered with a temperature signal from a temperature sensor on the stator coils 31, 32 or 33 or from temperature information from electronic components of the second control device 20, so that a temperature control for the solution of urea and water to be heated up and for the surrounding components can be realized which may also involve an overtemperature protection. Alternatively, it is also possible to determine the temperature from the temperature coefficient of the wires of the stator coils 31, 32 or 33 via a resistance measurement.

If the second control device 20 is to trigger the brushless DC motor 30 as drive unit with rotary motion, the seventh switch 24 is closed and the eighth switch 25 is opened. As also in the first control device 10, the brushless DC motor 30 can then be triggered in the second control device 20 via switches 11, 12, 13, 14, 15 and 16. The terminal of the seventh switch 24 which is used for opening the delta circuit may also have been provided between the first switch 11 and the fourth switch 14 or between the third switch 13 and the sixth switch 16, in which case analogous changes to feed lines 21, 23, 26 and 27 have to be made.

Figure 3:
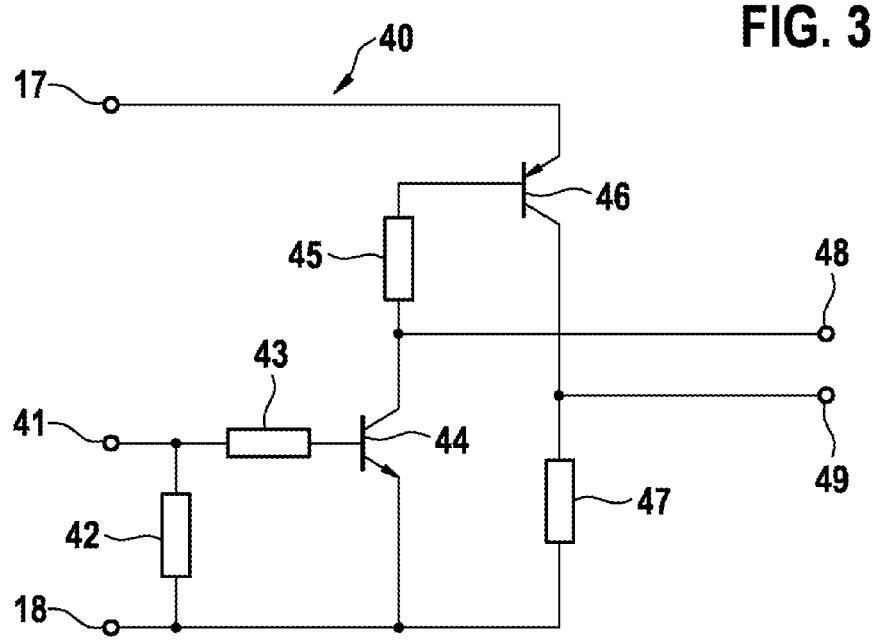

FIG. 3 shows a triggering circuit 40 for the seventh switch 24 and for the eighth switch 25, in order to switch over the second control device 20 from rotary operation to heating operation. The triggering circuit 40 is connected to the first power supply 17 and to the second power supply 18. By means of a control signal 41, switching-over between heating operation and rotary operation is effected. A first resistor 42 and a second resistor 43 adapt the level of the control signal 41 for the purpose of triggering a first transistor 44 of NPN type, which is connected to a second transistor 46 of PNP type via a third resistor 45. The first transistor 44 inverts the control signal 41 and feeds it to a first output 48. The second transistor 46 inverts the signal of the first output 48 and feeds it to a second output 49, in the course of which a fourth resistor 47, which is connected to the second power supply 18, serves as load resistance. The first output 48 is connected to the seventh switch 24; the second output 49 is connected to the eighth switch 25. If a voltage level that is suitable for switching through the first transistor 44 is applied to the control signal 41, a low level arises at the first output 48 and hence at the seventh switch 24, and the seventh switch 24 is open. Furthermore, a high level arises at the second output 49, and hence at the eighth switch 25, and the eighth switch 25 is closed. This corresponds to heating operation. For rotary operation, a voltage level that is suitable for blocking the first transistor 44 is applied to the control signal 41. The voltage level that is suitable for blocking is in this case lower than the voltage level that is suitable for switching through the first transistor 44. The triggering circuit 40 represented here is one embodiment and can, depending on the design of the seventh switch 24 and of the eighth switch 25, be adapted, in order to make suitable voltage levels available for the triggering of said switches. The inverter stages may also be realized by other transistor arrangements known in the state of the art. There may also be provision to trigger switches 24 and 25 directly via logic outputs of a microcontroller, without using an inverter stage.

Figure 4:
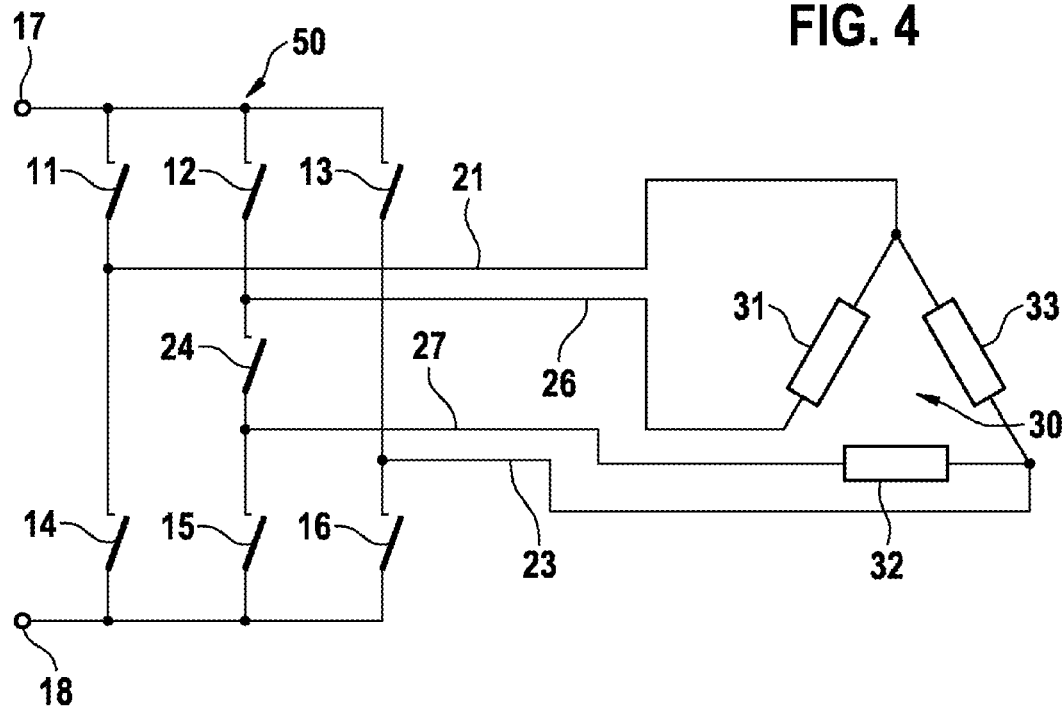

FIG. 4 shows a third control device 50 which represents a further supplement and improvement, according to the invention, to/of the first control device 10. Here too, a seventh switch 24 is provided for opening the delta circuit of the stator coils 31, 32 and 33. The seventh switch 24 has been looped into the connection of switch 12 connected to the first power supply 17 and of switch 15 connected to the second power supply 18. For rotary operation, the seventh switch 24 is closed and the electronic switches 11, 12, 13, 14, 15 and 16 are operated as in the case of control device 10 in such a way that a rotating field drives the rotor of the brushless DC motor 30. For heating operation, the seventh switch 24 is opened and the series circuit of the stator coils 31, 32 and 33 is connected to the first power supply 17 via the second switch 12 and also to the second power supply 18 via the fifth switch 15. A pulse-width modulation of the heating power can be performed via the second switch 12 or via the fifth switch 15. The looping-in of the seventh switch 24 which is used for opening the delta circuit may also have been provided between the first switch 11 and the fourth switch 14 or between the third switch 13 and the sixth switch 16, in which case analogous changes to feed lines 21, 23, 26 and 27 have to be made.

The invention claimed is:

1. A method for heating an apparatus driven by a brushless DC motor (30) having stator coils (31, 32 and 33), the method comprising:

applying, via at least one power supply, an electric voltage to the stator coils (31, 32 and 33) during a heating phase, and connecting the stator coils (31, 32 and 33) in series during the heating phase.

2. The method as claimed in claim 1, wherein the stator coils (31, 32 and 33) have a pulse-width-modulated operating voltage applied to them during the heating phase.

3. The method as claimed in claim 1, wherein a set value of an electric current through the stator coils (31, 32 and 33) is determined during the heating phase from (1) a temperature of the brushless DC motor (30), (2) from a temperature of a triggering circuit for the brushless DC motor (30), (3) from a resistance of the stator coils (31, 32 and 33), or a combination of (1), (2), and (3).

4. The method as claimed in claim lone of claims 1, wherein the electric current through the stator coils (31, 32 and 33) is regulated to the set value during the heating phase.

5. A control device for heating an apparatus driven by a brushless DC motor (30), wherein stator coils (31, 32 and 33) of the brushless DC motor (30) are arranged in a delta circuit and have an electric voltage applied to them via a first power supply (17) and a second power supply (18) during a heating phase, wherein a seventh switch (24) for opening the delta circuit of the stator coils (31, 32 and 33) of the brushless DC motor (30) is provided for a series circuit during the heating phase.

6. The control device as claimed in claim 5, wherein the series circuit is connected via at least one of a set of the switches (11, 12 or 13) to the first power supply (17), and in that an eighth switch (25) is provided for connecting the series circuit to the second power supply (18) during the heating phase.

7. The control device as claimed in claim 5, wherein the seventh switch (24), the eighth switch (25), or both comprise a MOSFET.

8. An exhaust-gas cleanup system which cleans exhaust gases of an internal-combustion engine by means of selective catalytic reduction, the system comprising:

an apparatus to convey a urea solution, the apparatus including a brushless DC motor (30) having stator coils (31, 32, and 33); and a control device for heating the apparatus, wherein stator coils (31, 32 and 33) of the brushless DC motor (30) are arranged in a delta circuit and have an electric voltage applied to them via a first power supply (17) and a second power supply (18) during a heating phase, wherein a seventh switch (24) for opening the delta circuit of the stator coils (31, 32 and 33) of the brushless DC motor (30) is provided for a series circuit during the heating phase.

* * * * *